United States Patent [19]
Leskinen

[11] Patent Number: 6,085,081
[45] Date of Patent: Jul. 4, 2000

[54] METHOD FOR ALLOCATING A USER IDENTIFICATION

[75] Inventor: Tom Leskinen, Tampere, Finland

[73] Assignee: Nokia Mobile Phones Ltd., Espoo, Finland

[21] Appl. No.: 09/016,028

[22] Filed: Jan. 30, 1998

[30] Foreign Application Priority Data

Jan. 31, 1997 [FI] Finland ................................. 970399

[51] Int. Cl.[7] ................................................ H04Q 7/38
[52] U.S. Cl. ........................ 455/406; 455/407; 455/435
[58] Field of Search ............................ 455/406, 407, 455/408, 410, 435, 558

[56] References Cited

U.S. PATENT DOCUMENTS

| | | | |
|---|---|---|---|
| 5,359,182 | 10/1994 | Schilling | 455/407 |
| 5,572,193 | 11/1996 | Flanders et al. | 340/825.34 |
| 5,629,975 | 5/1997 | Tiedemann, Jr. et al. | 455/435 |
| 5,657,373 | 8/1997 | Hermansson et al. | 455/435 |
| 5,722,067 | 2/1998 | Fougnies et al. | 455/408 |
| 5,819,178 | 10/1998 | Cropper | 455/435 |
| 5,850,599 | 12/1998 | Seiderman | 455/406 |

*Primary Examiner*—Daniel S. Hunter
*Assistant Examiner*—Thuan T. Nguyen
*Attorney, Agent, or Firm*—Perman & Green, LLP

[57] ABSTRACT

The invention relates to a method for allocating a user identification (ID) in a mobile communication network (2) for a connection between a communication terminal (1) and the mobile communication network (2). The user identification (ID) is a temporary user identification (TID). The method comprises at least the following steps:

- examining if the mobile station (1) has a user identification (ID),
- if the mobile station (1) has no user identification (ID), the mobile communication network (2) allocates a temporary user identification (TID) for the connection, and
- the mobile communication network (2) transmits the temporary user identification (TID) to the mobile station (1).

8 Claims, 5 Drawing Sheets

METHOD FOR ALLOCATING A USER IDENTIFICATION

The present invention relates to a method for allocating a user identification in a mobile communication network for forming a connection between a communication terminal and the mobile communication network, as well as to a system and a communication terminal according to the method.

In this specification, a communication terminal denotes primarily wireless communication devices including mobile stations as well as communication terminals in so-called wireless public telephones.

The most common digital mobile communication networks are so-called cellular networks. The base station subsystem (BSS) of the mobile communication network comprises base transceiver stations (BTS) and base station controllers (IBSC). The mobile station (MS) is in a data transmission connection via the radio channel to any base stations close to the location of the mobile station at the time. The base station is in a data transmission connection with the base station controller. Data transmission between the base station and the base station controller is usually carried via a cable. Each base station controller operates with a group of several base stations. The base station controller is, in turn, in a data transmission connection with a mobile services switching centre (MSC). The mobile services switching centres can, in turn, be in a data transmission connection with each other as well as with a landline communication network centre (PSTN, ISDN). The Information to be transmitted via the radio channel is usually divided into frames containing control information, speech converted to digital form, data, and error correction information. The frame structure can have several levels, wherein the frames of an upper level are formed by rearranging frames of a lower level.

In mobile communication networks at least part of the data transmission is performed wirelessly by using radio transmitters and receivers. The radio channel is a physically open resource which is available to anybody via suitable data transmission equipment. This involves security risks, for example eavesdropping or disclosure of the privacy of a location. In digital mobile communication networks, such as GSM netorks, digital data transmission is used which is difficult to eavesdrop. Further, it is possible to use caller identification and encryption in data transmission. For preventing eavesdropping, encryption methods have been developed for digital mobile communication networks, whereby the speech converted to digital form and the data signal are encrypted. Also other information carded via the radio channel can be encrypted, such as the identification data of a mobile station (International Mobile Subscriber Identity, IMSI) and the identification data on the location (Location Area Identification, LAI). In the receiver, the encrypted signal is deciphered back to unencrypted speech and data. The so-called encryption key and algorithm to be used in encryption are advantageously known only to the transceivers in question, wherein the deciphering of the coded signal to intelligible speech and data as well as to data control signals in a violent or illegal manner without the correct encryption key and algorithm is practically impossible, thanks to the efficient encryption algorithms currently in use.

In the GSM network, a mobile originated call is set up in a way that the GSM mobile station and the GSM network transmit control and identification signals required for call set-up to each other. In response to a connection request, the GSM mobile station is assigned a channel for signalling, if this is possible within the capacity of the GSM network. On this channel, the GSM mobile station transmits the GSM network a request for speech or data services. On the side of the GSM network, this request is transferred to the mobile services switching centre (MSC), in which the rights of the GSM subscriber in question are verified from the visitor location register (VLR).

Upon a mobile terminated call e.g. from a landline telephone network subscription, the switching centre of the telephone network transmits inter alia the telephone number of the mobile station to the mobile services switching centre. The MSC verifies the rights of the GSM subscriber in question from the home location register (HLR) and the visitor location register (VLR). Following this, the GSM network and the GSM mobile station transmit control and identification data required for call set-up.

In currently known digital mobile communication networks, network services used are charged on-the basis of usage time. In practice, the mobile communication network must constitute a system for recording the services and time used by each subscriber. For ensuring that the charges are debited against the correct users and that no other misuses are possible, the system must comprise sufficient identification of users. In addition to charging for time of use of mobile communication networks, teleoperators offering mobile services of mobile communication networks have normally introduced also monthly fees, wherein a subscriber who has made an agreement with the teleoperator in question must pay a certain sum irrespective of how much he or she uses the network. This basic fee for a certain time interval is meant to cover the costs of construction and maintenance of the mobile communication network.

The use of subscriber identifications is necessary also for identifying the users and checking their user rights. Therefore, it must be possible to identify each mobile user in a reliable way and to secure the confidentiality of the information.

In this description, an example of a digital mobile communication network is made with the GSM mobile communication network. In the GSM network, a so-called subscriber identity module (SIM) card is used for identification of each user. The SIM card contains the international mobile subscriber identity (IMSI) data which is specific to the SIM card. This mobile subscriber identity data is. used at the stage of registering the mobile station in the mobile communication network and upon using services of the mobile communication network, for example upon a mobile originated call to another telecommunication terminal. Further, the mobile station has advantageously its own equipment identification (International Mobile Equipment Identity, IMEI) for making a distinction between different mobile stations.

For the GSM mobile communication network, a general packet radio service (GPRS) has been developed, inter alia for transmission of data in the mobile communication network. For this GPRS system, an international mobile group identity (IMGI) is under development, wherein it would be possible to set up also point-to-multipoint (PTM) connections, i.e. for example a group call from one mobile station to several mobile stations. Also this requires user identification which is made by transmitting the international mobile subscriber identity IMSI at the stage of setting up the connection.

For using the GSM mobile communication network, the user must thus make a subscription agreement with a teleoperator offering mobile communication network services, wherein the user receives a SIM card and the necessary identification data. This SIM card must be coupled to the mobile station with which the user wishes to be connected with the GSM mobile communication network.

However, not all users of a mobile communication device want to commit themselves to using the services of a certain teleoperator only, but some would possibly wish to select the teleoperator to be used at a time. On the one hand, some persons may have a very small need for using a mobile communication network, wherein payment of monthly fees or the like would excessively raise the price of calls. In view of persons who seldom need a mobile station, it is also not reasonable to make a subscriber agreement, because the person should anticipate his or her possible need for making calls well in advance. On the other hand, there may also be situations in which the caller does not want his or her identity to be registered in the mobile communication network, but he or she wishes to remain unidentified. At present, this is primarily possible only at public telephones, but these are usually connected with a landline telecommunication network.

One aim of the present invention is to provide a method and a mobile communication system in which the user identification is allocated dynamically, i.e., every time upon setting up a connection to the mobile communication network, the user in question is allocated a user identification for the time of the connection. Thus the connection charge can be advantageously debited during the call or immediately after its termination, for example by using electronic money, a credit card or a bank card. The invention is based on the idea that the mobile station used for setting up the call informs the mobile communication network of a need for call set-up, the mobile communication network allocates a user identification for the connection and transmits the user identification to be used to the mobile station for example for set-up and transmission of the signals and control information required during the connection. The method of the invention is characterized in that the user identification used is a temporary user identification, and that the method comprises at least the following steps:

examining if the mobile station has a user identification, if the mobile station has no user identification, the mobile communication network allocates a temporary user identification for the connection, and the mobile communication network transmits the temporary user identification to the mobile station.

The mobile communication system of the present invention is characterized in that the system comprises:

means for examining the existence of a user identification, means for allocating a temporary user identification, means for transmitting the temporary user identification to the communication terminal, and means for using the temporary user identification instead of a user identification.

Further, the communication terminal of the invention is characterized in that it comprises:

means for examining the existence of a user identification, means for acquiring a temporary user identification from the mobile communication network, and means for using the temporary user identification.

The present invention gives significant advantages to the methods and systems of prior art. In the system of the invention, no SIM card is needed, which makes it possible for the user to select, if desired, the teleoperator whose network he or she intends to use. Moreover, the user does not need to make a subscriber agreement with any teleoperator. Further, the invention gives the advantage that the debiting can be made on the basis of the realized usage time without a separate fixed monthly fee or the like, which is a more advantageous alternative for a person who needs mobile communication network services relatively seldom. Also, the invention makes it possible to implement wireless public telephones in an advantageous manner without allocating the public telephones fixed identifications.

The invention will be described in more detail in the following description with reference to the appended drawings. In the drawings.

Figure 1:
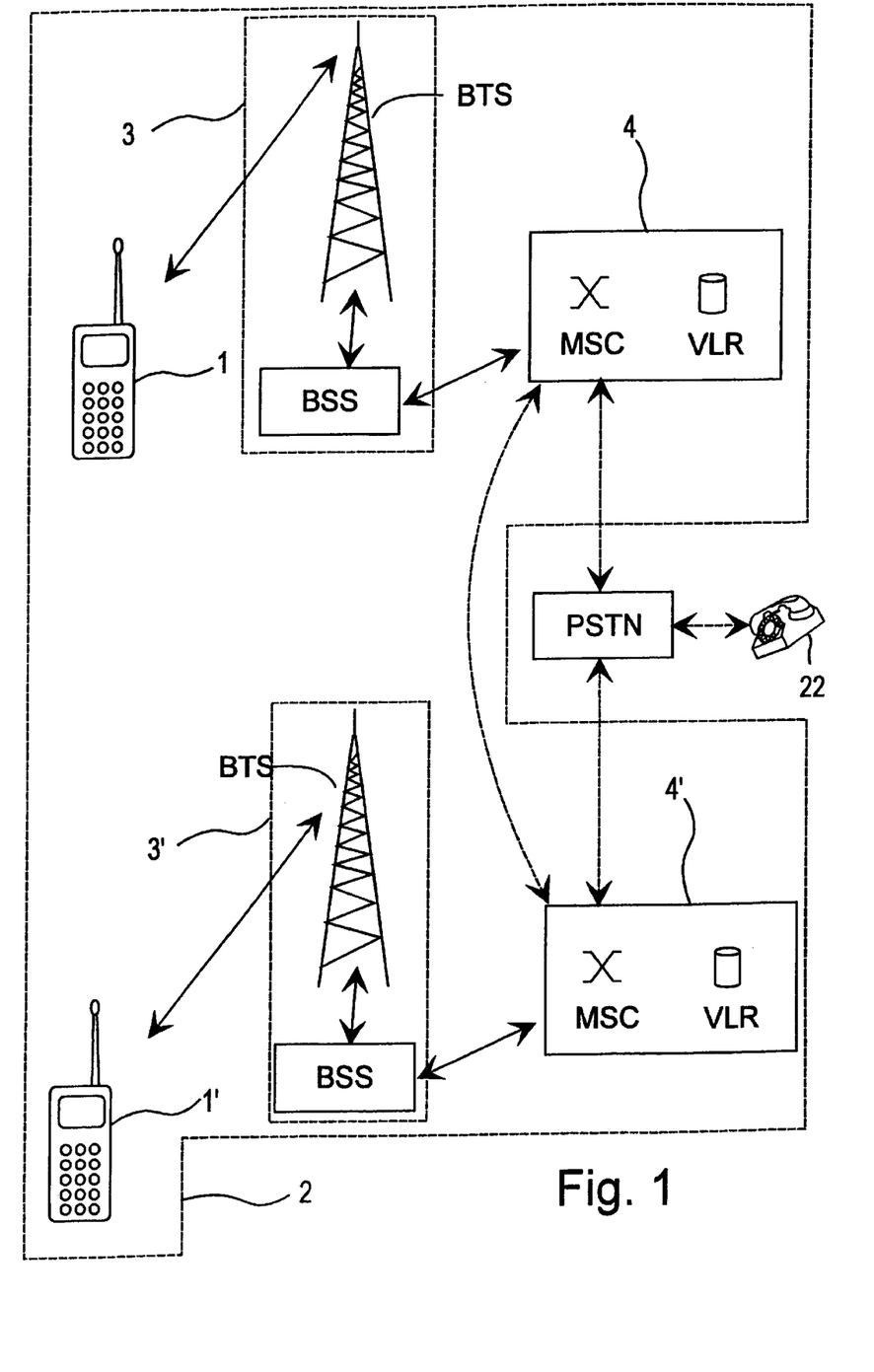
FIG. 1 is a reduced chart showing a mobile communication system in which the invention can be advantageously applied.
Figure 2:
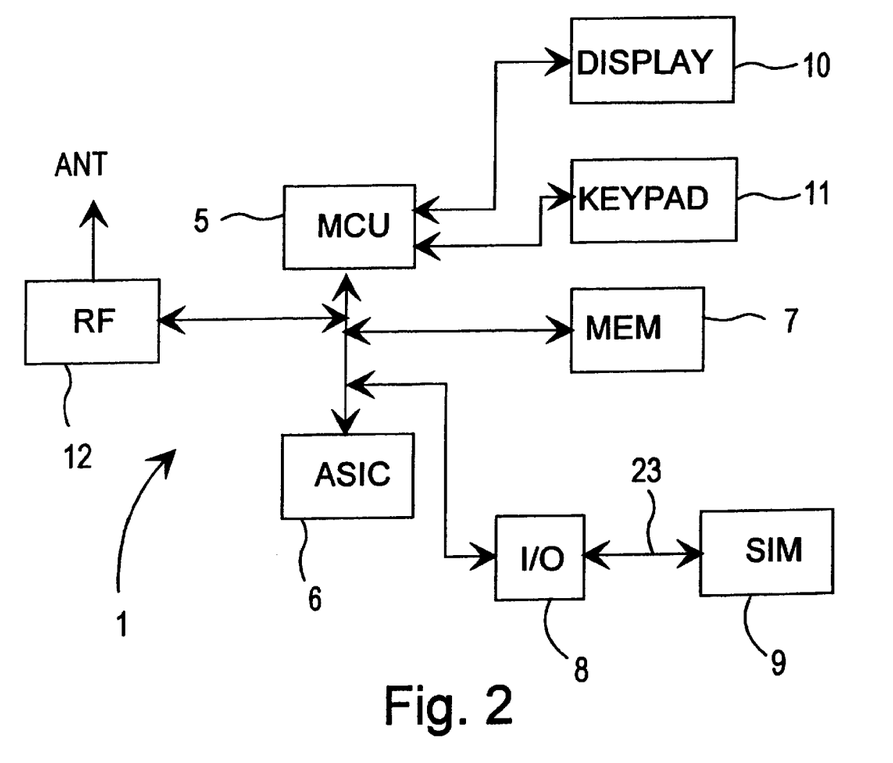
FIG. 2 is a reduced block chart showing an advantageous mobile station according to the invention.

In the following, the invention will be described in the system shown in FIG. 1, comprising at least one mobile station 1 and a mobile communication network 2. The mobile communication network 2 comprises one or several base station systems 3, 3' as well as one or several mobile services switching centres 4, 4'. FIG. 2 is a reduced block diagram showing an example of the mobile station 1 which can be used in the system of FIG. 1. Normally, the use of the mobile station 1 requires that a SIM card or a corresponding identification card is inserted in a connector (not shown) arranged for this purpose in the mobile station 1, wherein the mobile station 1 is capable of reading the data stored in the SIM card. If the SIM card is not in its place or it is defective or the data is not readable for another reason, it is usually not possible in known mobile communication networks to make a call from the mobile station 1, except maybe to a predetermined special number, such as the emergency number.

The control electronics of the mobile station comprises advantageously a microprocessor 5 (MCU), an application-specific logic circuit 6 (ASIC), and a memory 7 (MEM). The memory 7 comprises advantageously a read-only memory (ROM) inter alia for storing the application software, a random access memory (RAM) for storing information which is needed during the use and is possibly variable, and an electrically erasable programmable read-only memory (EEPROM) for storing different set-up information. It is known as such that the EEPROM can be used also for storing variable information and parts of the application software code. The application-specific logic circuit 6 can be used for forming very complex logic couplings between different functional units. One such coupling is address coding with which inter alia the microprocessor can control different blocks, such as the memory 7 and a bus adapter 8 (I/O). The application-specific logic circuit 6 replaces a significant part of separate logic circuits, wherein the size of the device can be reduced.

Further the mobile station 1 of FIG. 2 comprises a display means 10 and a keyboard 11.

The transmission and reception of the radio-frequency signals are conducted in a high-frequency block 12 (RF) which comprises advantageously a transmitter, a receiver, a local oscillator, a modulator, and a demodulator. These are not described in more detail in this specification, because they are not essential for describing the present invention and are prior art known to an expert in the field.

The mobile station 1 according to the invention can be used also without a SIM card, by connecting to the SIM card adapter or corresponding reading device of the mobile station another means of payment, advantageously in the form of a card, such as a smart card 9.

So-called smart cards or processor cards are small cards (FIG. 3a) manufactured usually in the size of a credit card and having a microprocessor and electronic circuits required for its use laminated in plastic. Further, the surface of the card is usually provided with electric contacts for connecting supply voltages to the card and for transferring control and data signals between the card and its read/write device. In the standard ISO/IEC 7816-3 of the International Standardisation Organisation presents a smart card form and a description of its electric operation as well as an interface to the apparatus using the card. Also, systems have been developed for transferring the signals between the card and its read/write device as well as the supply voltages to the card in a wireless manner e.g. as high frequency electromagnetic signals.

Figure 3A:
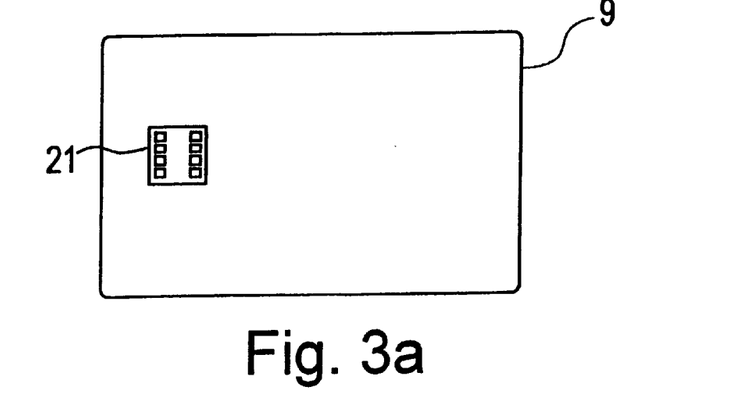
FIG. 3a shows a smart card.
Figure 3B:
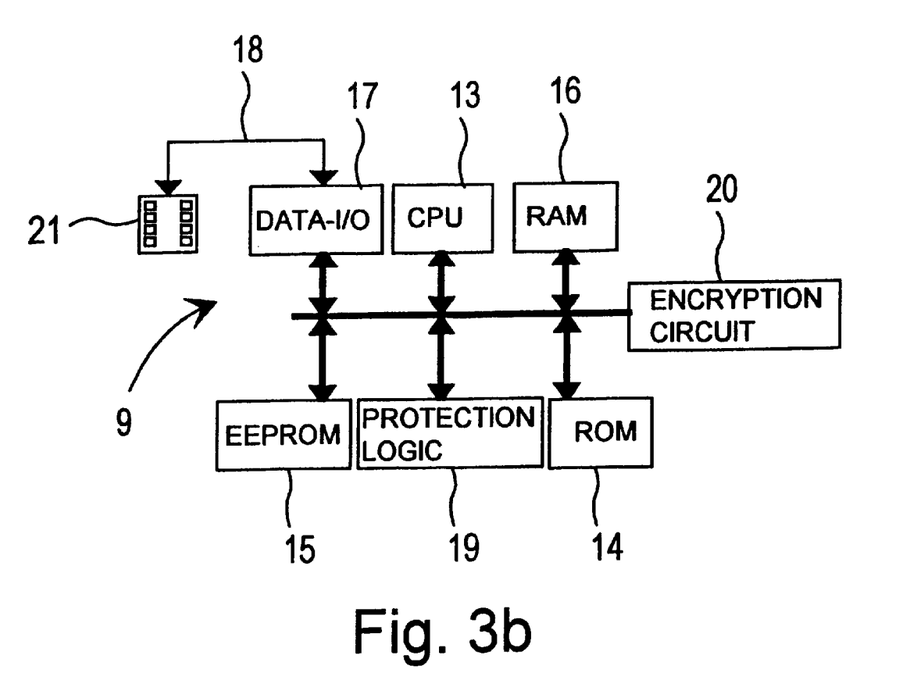
FIG. 3b shows a smart card in a reduced block chart.

FIG. 3b shows the internal structure of a smart card 9, known as such, in a reduced block diagram. A central processing unit 13 (CPU) controls the operation of the smart card 9 on the basis of a program code stored in a program memory 14 (ROM). A data memory 15 (EEPROM) can be used for storing different user-specific information which will remain in the memory permanently. During operation of the smart card, a random access memory 16 (RAM) can be used as a temporary data storage. The bus adapter 17 (DATA-I/O) of the smart card adapts the smart card 9 to connection lines 23 of a read/write device as well as to a control and data line 18. In this specification, the read/write device of the card is a wireless telecommunication terminal, such as a mobile station 1. For securing the operational safety and for preventing misuse of the smart card 9, it comprises also a safety logic consisting of a protection logic 19 and an encryption circuit 20. Thus, a personal identity number PIN can be stored on the smart card 9, wherein the protection logic 19 checks up the personal identity number in connection with use of the smart card 9. The purpose of the encryption circuit 20 is inter alia the encryption of data transmission between the smart card 9 and the reading device. The properties and function of the smart cards can be set by storing application software according to the use in the program memory of the card advantageously at the manufacturing stage. In FIGS. 3a and 3b, the pins 21 of the smart card are shown only in a reduced manner. The physical measurements and position of the pins for a commonly used smart card type are defined in the ISO/IEC standard 7816.

According to the standard, information is transferred between the smart card 9 and the read/write device in serial form. Data transmission can be asynchronous or synchronous. The information bits are transferred via the I/O line (not shown) of the smart card contact in so-called half duplex mode, i.e., information is transferred to one way at a time. In synchronic data transmission, the transfer of information bits is controlled by a clock signal which is coupled to the clock line of the smart card contact (not shown). Information is transferred in bytes, i.e., eight bits in one frame. The frame comprises also a start bit and a parity bit. After each character, there is a waiting period for separating subsequent characters from each other. For data transmission, said smart card standard ISO/IEC 7816-3 defines two logic states for the I/O line: Z and A, denoting to the bit values 1 and 0, respectively. The electric values corresponding to these states depend, inter alia, on the supply voltages used at the time (e.g. 3 V or 5 V) and are mentioned here only as an example.

After the operating voltage is supplied to the smart card 9, the smart card 9 transmits to the reading device the data containing its functional requirements, such as the type of the smart card 9, the protocols supported by it, and the data on the manufacturer. For reading this data, the ISO/IEC standard 7816-3 defines the so-called ATR procedure (answer to reset) and PTS procedure (protocol type selection). If the smart card contains several protocols available, the reading device will advantageously select the one to be used at the time.

At the next stage it is possible to read application information from the smart card 9 and to check that the smart card 9 supports the necessary directory structures and information defined for example for a charge card. The GSM mobile station identifies the SIM card connected to the smart card connector of the mobile station on the basis of the GSM directory, because the SIM card contains the directory identification which is 7F 20, given as a hexadecimal number.

Smart cards 9 are used for example as charge cards in several different applications, such as in public telephones, as coin cards, as means of payment in public transportation, etc. When a smart card is to be used as a charge card, money can be stored on its so-called electronic purse for example at on-line banking terminals having the equipment for controlling the smart card and depositing money on the card. Such a card may not necessarily contain any information on the card owner, so the charge card can also be used in applications in which it is not necessary to identify the user.

Smart cards 9 have been recently implemented also as cash cards, bank cards and credit cards, wherein the identification data on the card owner and on the card can be stored in the data memory of the card instead of, or in addition to, a magnetic track.

For example the SIM card used in GSM mobile stations is one type of a smart card. More detailed definitions on the SIM card are presented in the GSM standard 11.11.

The following is a description of the operation in a situation that another smart card 9 than a SIM card is connected to a mobile station 1. Also in this situation, after booting the smart card, the mobile station 1 reads from the smart card 9 the information required by it according to the above-mentioned ATR and PTS procedures. Also application data is read from the smart card 9, and a search for the directory identification 7F 20 is made. In this case, said identification is not found; consequently, the application software of the mobile station deduces that the smart card 9 is not a SIM card. Thus the mobile station 1 finds that there is no user identification ID available for the mobile station. This information is advantageously stored in the memory 7 of the mobile station 1 and utilized e.g. in call set-up to the mobile communication network 2.

Figure 4:
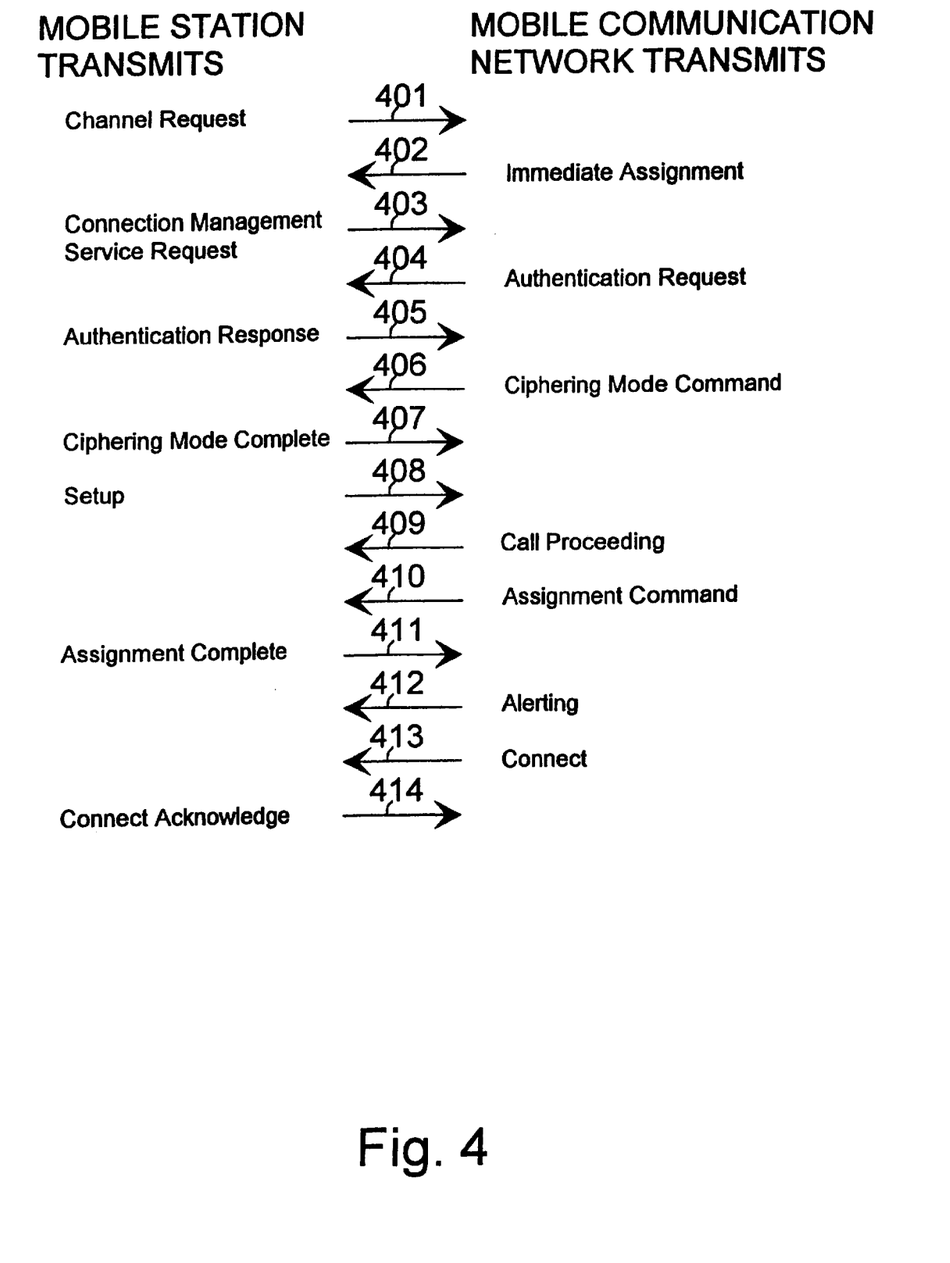
FIG. 4 is a reduced arrow chart showing the signalling of call set-up in the GSM network.

After the user of the mobile station 1 has selected a telephone number and pressed the send button, the mobile station 1 and the mobile communication network 2 start signalling to each other for setting up a connection. FIG. 4 shows a reduced signalling chart on call set-up according to the GSM mobile communication system, when a mobile originated call is made from the mobile station 1 to another telecommunication terminal 22 which can also be a second mobile station 1'. At first, the mobile station 1 requests the mobile communication network 2 for a free communication channel for a connection (arrow 401). If there is a free channel, the mobile communication network 2 transmits the information on the communication channel to the mobile station 1 (arrow 402). Next, the mobile station 1 transmits a connection management service request (arrow 403), in which the mobile station 1 informs the mobile communication network 2 inter alia of the fact that the mobile station is without a user identification, wherein a temporary user identification TID must be allocated to the mobile station 1. The way of giving this information depends on the structure and type of the mobile communication network 2 to be used at the time. For example, it is possible to determine a code which is transmitted instead of the user identification from the mobile station 1 to the mobile communication network 2. This code must be different from any user identification used in said mobile communication network 2, but the code comprises preferably as many bits as are reserved for a user identification, and it is transmitted in the same message and in the same field as the user identification. Exemplar values for such a code are 00000000 or 99999999.

Figure 5:
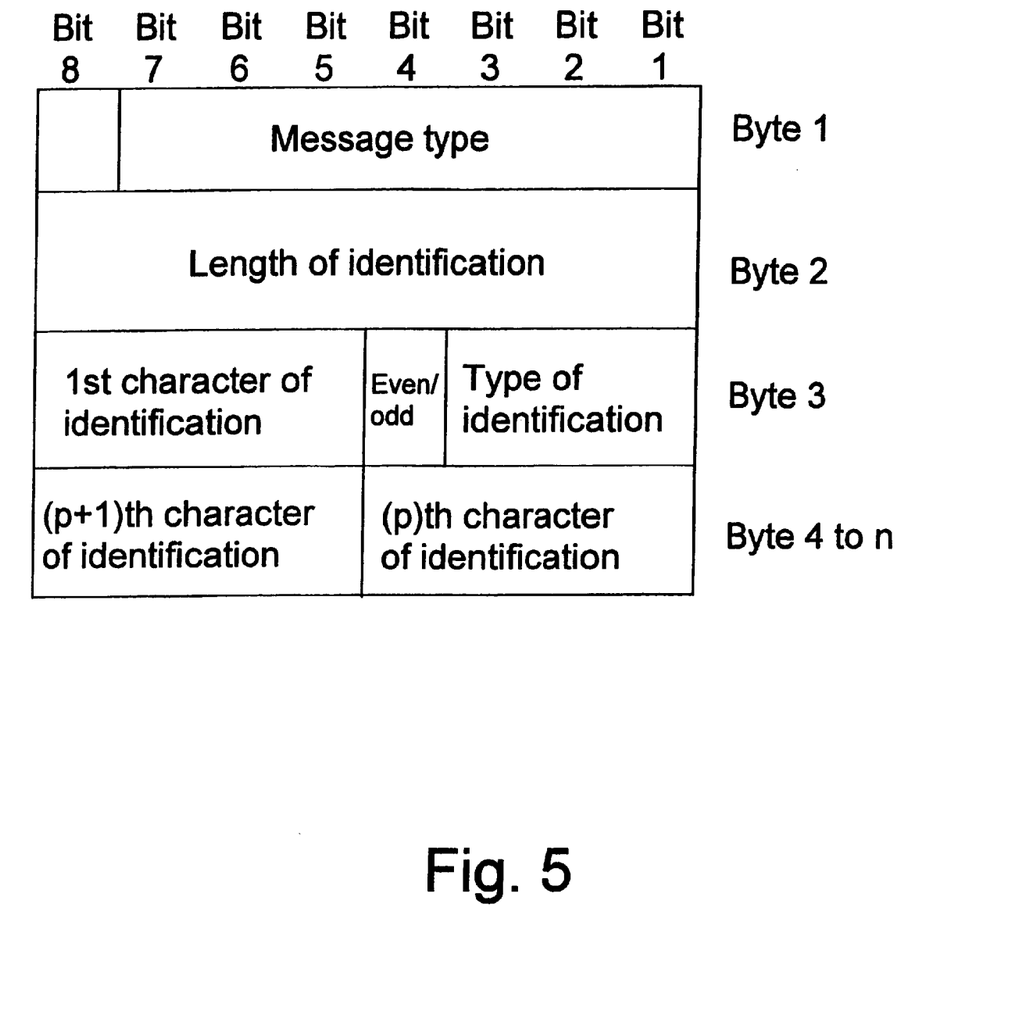
FIG. 5 shows a mobile station identification data frame according to the GSM standard.

FIG. 5 shows a mobile identity frame which complies with the GSM standard 04.08 version 4.11.0 and is transmitted from the mobile station 1 to the mobile communication network 2. The bits 1 to 7 of the first byte are reserved for the type of the data frame. The second byte gives the length of the data frame. In the third byte, the bits 1 to 3 are reserved for the type of the user identification. According to the standard, the type can be any of the following:

001 international mobile subscriber identity (IMSI)

010 international mobile station equipment identity (IMEI)

011 international mobile station equipment identity, software version (IMEISV)

100 temporary mobile subscriber identity (TMSI)

000 no user identification

The fourth bit in the third byte denotes whether the length of the user identification has an even or odd number of four-bit numbers. The bits 5 to 7 of the third byte contain the first number of the user identification. The rest of the numbers in the user identification are contained in the next bytes.

The mobile station 1 without a user identification sets the type of the user identification to the value 000 in the identification frame of the mobile station to be transmitted from the mobile station 1. On the other hand, if the aforementioned code is used, this code (for example 99999999) is set as the user identification in said frame.

In the mobile communication network 2, for example a number range is reserved for temporary user identifications TID, such as the numbers xx to xx+10 000, wherein xx is the first number in said range. From the number range, a temporary user identification TID can be selected for each connection. In this example, 10 000 temporary identifications are available at the same time, but the size of the range can also be smaller or larger than 10 000.

The numbers for the temporary user identification are stored for example in the storing equipment of the mobile services switching centre 4, for example in connection with the visitor location register VLR. The storing equipment or the like contain also means for recording the number either reserved or free, wherein a new allocation is made only among the numbers recorded free, as will be described below in this specification.

The base transceiver station BTS of the mobile communication network 2 receives the signals transmitted from the mobile station 1 and transfers them via a base station controller BSC to the mobile services switching centre 4, which will interpret them. Thus after detecting on the basis of said code or user identification type that the transmitter of the signals is a mobile station without a user identification, the mobile services switching centre 4 selects a temporary user identification TID which is free at the time, from among the temporary user identifications, for example in said number range. The temporary user identification is transmitted to the mobile station 1 which will possibly display it also to the user of the mobile station on the display means 3 of the mobile station. The user identification is transmitted advantageously in the same message in which the mobile communication network 2 normally transmits an authentication request to the mobile station 1 (arrow 404). This is to ensure that the user of the mobile station 1 really has the right to use it. Authentication is important also in the mobile station of the invention particularly when the smart card 9 is a credit card or a bank card. After this, the temporary user identification TID is used for call set-up instead of a user identification ID stored on a SIM card. The mobile station 1 transmits a response message to the authentication of the user rights (arrow 405).

In the next step, signalling is started in connection with encryption of the data transmission, if encryption has been made available by the teleoperator of the mobile communication network 2. As shown in FIG. 4, this involves the ciphering mode command from the mobile communication network 2 to the mobile station 1 (arrow 406) and the ciphering mode complete message from the mobile station 1 to the mobile communication network 2 (arrow 407).

After this, the mobile station 1 transmits a call set-up message (arrow 408) to give inter alia the phone number to be dialled as well as the network services needed by the mobile station 1 to the mobile communication network 2. The mobile communication network 2 starts call set-up to the selected phone number and sends a call proceeding message to the mobile station 1 (arrow 409). Further, the mobile communication network 2 sends the mobile station 1 information on the radio channel settings required for the call, such as the channel frequency and power level, in an assignment command (arrow 410). The mobile station 1 responds by sending an assignment complete message (arrow 411) after having completed said operations.

At this stage, the second telecommunication terminal 22 is expected to answer the call. The mobile communication network 2 sends an alerting signal (arrow 412) to the mobile station 1, in which a waiting tone is formed in the receiver as a sign to the user. If the connection cannot be made for example when the second telecommunication terminal 22 is busy, also this is indicated in a corresponding way with a busy tone, a tone on hold, or another signal known as such.

If the second telecommunication terminal 22 responds, the mobile communication network 2 sends the mobile station 1 a message informing of the connection (arrow 413), wherein the mobile station 1 sends a message acknowledging the connection (arrow 414), and the call can be started. Advantageously at this step the mobile communication network 2 starts counting information on the connection charges.

The above-mentioned call set-up is only an example, but the invention can also be applied in other types of mobile communication networks 2 and the call set-up can be different from that presented above.

The mobile station 1 operates now like a normal mobile station that can be connected to the mobile communication network 2 in question, wherein the user of the mobile station 1 has access to those services of the mobile communication network 2 for which the teleoperator of the mobile communication network has given the access rights also to users without a user identification of their own.

In a geographical area, there are often mobile communication networks 2 maintained by more than one teleoperator.

In such a situation, the mobile station 1 can examine the mobile communication networks 2 available in the service area of the mobile station 1 and inform the user of them for example on the display means DISPLAY of the mobile station. The user can thus advantageously select the mobile communication network 2 of the teleoperator of choice.

The mobile communication network 2 used for establishing the connection registers the connection time and advantageously after the connection transmits information on the costs to the mobile station 1 which will further transfer the information to the smart card 9. If the smart card 9 is a charge card or the like, the sum corresponding to the costs of the connection is reduced from the quantity of money deposited in it, wherein the call is paid.

The connection can be terminated for example in a way that the user of the mobile station 1 or of the second telecommunication terminal 2 cuts the connection. Thus the mobile communication network 2 and the mobile station 1 conduct the disconnection signalling (not shown). However, the connection can also be cut in a way that the mobile communication network 2 loses connection to the mobile station 1, wherein it is not possible to conduct the disconnection signalling. A reason for this can be for example a long distance to the nearest base station, discharging of the battery, disconnection of the battery, etc. Also in a situation like this, it should be possible to debit the connection costs correctly. The way of doing this depends inter alia on the type of the smart card 9 used. If the smart card 9 is a credit card, bank card or the like, the mobile communication network 2 can make the charge advantageously on the basis of the moment when the connection was cut. If the smart card 9 is a charge card intended for direct payment, the application software of the mobile station 1 can transmit the payment information to the smart card also in a situation when the connection is cut for another reason than disconnection of the battery. The mobile station 1 advantageously monitors the charge potential of the battery, and if the charge level is reduced below a predetermined value, the control electronics of the mobile station will give information on this for example by a change in the state of a certain control line (not shown), wherein this is observed by the application software of the mobile station 1 and the necessary operations are made, such as payment of the connection charge and informing the user of the mobile station 1 about the discharging of the battery.

If the battery is disconnected during the call, it may be possible that the connection charge cannot be debited from the smart card. Thus it is possible to operate for example in a way that the mobile communication network 2 records the connection charge and the information that the charge has not been paid. The next time that the mobile station 1 is connected to the mobile communication network 2, in connection with the signalling the mobile station 1 receives information on the undebited connection charge, wherein the mobile station 1 reduces the connection charge from the balance of the smart card 9. For preventing attempts to avoid the connection charge by moving the smart card 9 to another mobile station, it is advantageous that the information on the unpaid connection charge is stored also the smart card 9, wherein the use of the smart card 9 can be prevented until the charge has been appropriately paid. For example, the smart card 9 has one bit in the non-volatile memory whose state is changed at the beginning of the connection. The state of said bit is changed back first after the payment has been made. The operations presented above are only examples, on the basis of which an expert in the field can apply the invention.

The invention can also be applied in a way that the connection costs are monitored in real time, i.e., the sum corresponding to the connection time is reduced during the connection from the balance on the smart card 9. If the balance of the card is reduced to zero, the connection is cut off, unless the smart card is provided with a credit option. The mobile station 1 can also read the balance of the card in advance and possibly give it to the mobile communication network 2. Thus the mobile communication network 2 or the mobile station 1 can, on the basis of the time charge corresponding to the formed connection, calculate how long it is possible to maintain the connection with the sum of money deposited on the card, wherein the call can be cut off when the time is up. The price of the time charge is usually dependent on whether the second telecommunication terminal is a terminal of a landline telecommunication network or for example another mobile station.

When the smart card 9 is a credit card or bank card, the operation differs from that presented above, inter alia, in the respect that the identification of the card user must be transmitted to the mobile communication network 2, because the actual payment will be made by separate debiting either through a bank or a credit card company. The identification data and the password of the card user are stored in the smart card. The mobile station 1 asks for the user password which can be entered advantageously via the keyboard KEYPAD of the mobile station 1. After checking that the password is correct, the mobile station 1 starts signalling with the mobile communication network 2, as described above in this specification, and transmits inter alia the user identification to the mobile communication network 2 preferably in encrypted form for preventing misuse. On the basis of these identification data, the teleoperator can charge the user for the connection.

After the connection is cut, the temporary user identification TID is deallocated and it can be used in a new connection. There are preferably several temporary user identifications TID, one of which is allocated for the connection to be formed at a time. It is thus possible to form several connections by the method according to the invention within the capacity of the mobile communication network 2. The temporary user identifications TID are local, for example according to the area of one mobile services switching centre 4, wherein they do not contain area or country codes. Thus the same numbers can be used in different areas (at different mobile services switching centres 4) without risk of overlapping. If needed, however, the mobile communication network 2 can add an area and/or country code to the temporary user identification TID.

In a situation that the mobile station 1 is moved outside the area of the mobile services switching centre 4, the connection will be taken over by a second mobile services switching centre 4'. In this situation, the temporary user identification TID that was used by the first mobile services switching centre 4 becomes free and the second mobile services switching centre 4' allocates a new temporary user identification from its own user identification register for the connection. In some cases, the new user identification can be identical to that used at the first mobile services switching centre 4.

Sometimes there may be a situation when the mobile station 1 moves outside the area of the mobile communication network 2. Also in this case it is possible to operate as above, when changing from one mobile services switching centre 4 to another mobile services switching centre 4', wherein the temporary user identification TID that was used at the mobile services switching centre 4 belonging to the first mobile communication network 2 becomes free, and a new temporary user identification for the connection will be allocated by the mobile services switching centre of the second mobile communication network (not shown) from its own user identification register.

The present invention can be advantageously applied in also other wireless telecommunication terminals than mobile stations. One such application is a wireless public telephone. Thus the public telephone comprises a wireless communication terminal 1 connected to the mobile communication network 2 of a teleoperator, or if the wireless telecommunication terminal is in the service area of several teleoperators, the user can be offered an option between mobile communication networks 2, as presented above. The wireless communication terminal 1 is advantageously turned on all the time. The user inserts his or her smart card 9 to be used as a means of payment in the reading device of the wireless communication terminal 1. This is observed by the control electronics of the wireless communication terminal 1, which reads the data on the card, such as the card type, which also in this application can be any of the types presented above. After this, the operations core respond to those of the embodiment presented above. After the call, the user removes his or her card from the wireless telecommunication terminal 1.

A further advantageous embodiment of the invention is the payment of road tolls, bridge tolls and the like. The vehicle of the user is provided with a payment device comprising means for reading the smart card as well as means for forming a connection to a charge debiting device or the like. This is usually placed in the vicinity of the road, wherein when the vehicle passes said device, the payment device installed in the vehicle and the debiting device will communicate. The debiting device informs the payment device of the sum to be paid. The payment will be made against a smart card connected to the payment device or, in case of using a bank or credit card, the payment will be debited against the card owner, as presented above in connection with this specification. The payment device can also comprise a mobile station, wherein the connection between the payment device and the receiving device can be a telephone connection, in which a temporary user identification TID can be used as the user identification.

This method of payment gives the advantage that the payment is made quickly and automatically, wherein the driver of the vehicle does not need to stop, if a smart card is connected to the payment device.

Although the invention was described above with reference to a mobile originated call 1, the invention can also be applied in a mobile terminated call from a second telecommunication terminal 22, 1' to the mobile station 1.

The invention is not limited only to the examples presented above, but it can be varied in the scope of the appended claims.

What is claimed is:

1. Method for allocating a user identification (ID) in a mobile communication network (2) for forming a connection between a communication terminal (1) and the mobile communication network (2), in which method the user identification (ID) used is a temporary user identification (TID), and that the method comprises at least the following steps:

examining if the mobile station (1) has a user identification (ID);

if the mobile station (1) has no user identification (ID), the mobile communication network (2) allocates a temporary user identification (TID) for the connection, and the mobile communication network (2) transmits the temporary user identification (TID) to the mobile station (1), characterized in that the examination of the user identification (ID) is conducted in the mobile station (1), wherein the mobile station (1) informs the mobile communication network (2) about the need for allocating a temporary user identification (TID).

2. Method according to claim 1, in which the mobile communication network (2) comprises one or several mobile services switching centres (4), characterized in that the temporary user identification (TID) is allocated at the mobile services switching centre (4).

3. Method according to claim 1, characterized in that a smart card (9) is connected with the communication terminal (1), and that the type of the smart card (9) is examined in the communication terminal (1), wherein when the smart card (9) is a charge card, the communication terminal (1) i s allocated a temporary user identification (TID) and the connection costs are debited against the charge card.

4. Mobile communication system comprising one or several communication terminals (1) and at least one mobile communication network (2), in which system a user identification (ID) is arranged to be used in the connection between the communication terminal (1) and the mobile communication network (2), and which system comprises:

means (1) for examining the existence of a user identification (ID);

means (4) for allocating a temporary user identification (TID);

means (1, 3, 4) for transmitting the temporary user identification (TID) to the communication terminal (1), and means (1) for using the temporary user identification (TID) as the user identification (ID);

characterized in that the means (1) for examining the existence of a user identification (ID) comprise the control electronics (5, 7) of the communication terminal.

5. System according to claim 4, wherein the mobile communication network (2) comprises one or several mobile services switching centres (4), characterized in that the means (1) for allocating a temporary user identification (TID) comprise the mobile services switching centre (4).

6. Communication terminal (1) to be used for setting up a connection via a mobile communication network (2) to another telecommunication terminal (1', 22), which communication terminal (1) comprises:

means for acquiring a temporary user identification (TID) from the mobile communication network (2); and means (MCU) for using the temporary user identification (TID);

characterized in that the communication terminal (1) comprises means (MCU) for examining the existence of a user identification.

7. Communication terminal (1) according to claim 6, characterized in that the means for examining the existence of a user identification (ID) comprise means (8) for reading a smart card (9).

8. Communication terminal (1) according to claim 7, characterized in that it comprises further means (MCU, 9, 8) for transferring information on payment of the connection charge to the smart card (9) or the mobile communication network (2).

* * * * *